United States Patent [19]

Chambers

[11] Patent Number: 4,715,638
[45] Date of Patent: Dec. 29, 1987

[54] ROBOTIC HAND WITH SLIP COUPLINGS

[76] Inventor: Francis T. Chambers, Rock House, Ballycroy, Westport, County Mayo, Ireland

[21] Appl. No.: 862,946

[22] Filed: May 14, 1986

[30] Foreign Application Priority Data

May 14, 1985 [IE] Ireland ............................... 1190/85

[51] Int. Cl.$^4$ .............................................. B66C 3/16
[52] U.S. Cl. ...................................... 294/88; 294/106
[58] Field of Search ...................... 294/88, 106, 86.25, 294/86.3, 87.1, 103.1, 115, 116; 623/64; 901/36, 37, 38, 39, 49; 414/750, 751, 753, 739, 744 A

[56] References Cited

U.S. PATENT DOCUMENTS

| 3,413,658 | 12/1968 | Becker ................................... 623/64 |
| 3,509,583 | 5/1970 | Fraioli . |
| 3,604,017 | 9/1971 | Brown et al. .......................... 623/64 |
| 3,694,021 | 9/1972 | Mullen ................................. 294/106 |
| 3,866,966 | 2/1975 | Skinner . |
| 4,350,381 | 9/1982 | Hellman ................................. 294/88 |
| 4,351,553 | 9/1982 | Rovetta et al. ...................... 294/106 |
| 4,367,891 | 1/1983 | Wauer et al. .......................... 294/88 |
| 4,591,199 | 5/1986 | Zajac ..................................... 294/88 |

FOREIGN PATENT DOCUMENTS 237085 7/1925 United Kingdom .
1201182 8/1970 United Kingdom .

Primary Examiner—James B. Marbert
Attorney, Agent, or Firm—Sughrue, Mion, Zinn, Macpeak and Seas

[57] ABSTRACT

A robotic hand consisting of one or more jointed fingers each formed from a number of link elements. A torque control is supplied for each element so that undue pressure is not exerted by any link element on an object being gripped. The invention provides an electromechanical simulation of a human hand, flexing to encompass objects rather than impinging against them.

21 Claims, 7 Drawing Figures

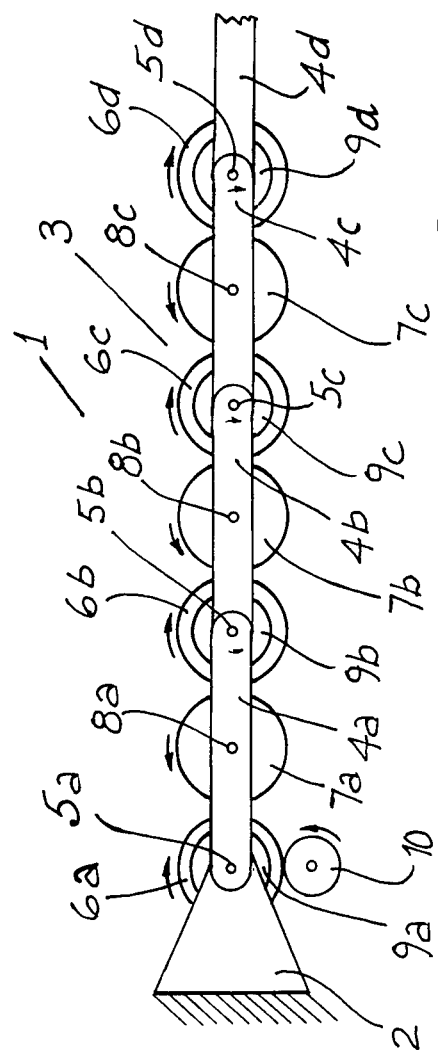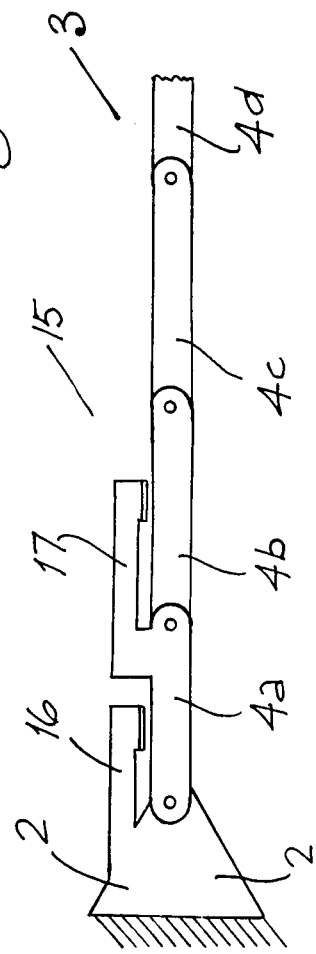

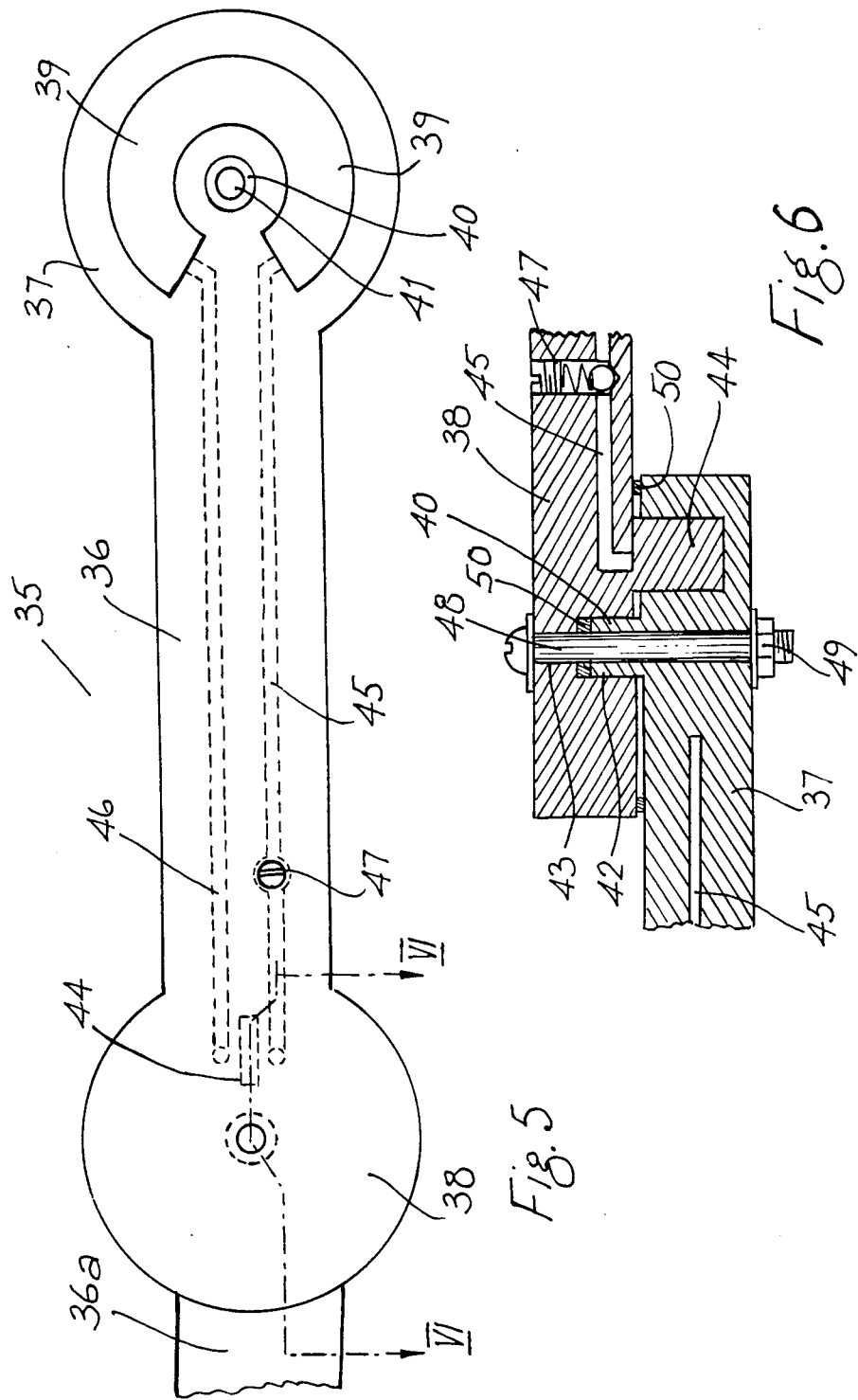

4,715,638

ROBOTIC HAND WITH SLIP COUPLINGS

BACKGROUND OF THE INVENTION

1. Introduction

The present invention relates to materials handling equipment and robots and in particular to a mechanical gripping device, an artificial hand or a robot gripping device hereinafter referred to collectively as a robotic hand.

2. Field of the Invention

Essentially, when using mechanical handling equipment such as robots there is little difficulty when the object being gripped or held is always substantially the same size. When this is the case then the gripping device or hand can be fashioned specifically to grip the particular device or object. However, an entirely different problem arises when it is necessary to grasp irregularly-shaped objects about whose shape no prior information is available. Essentially then what one is trying to do is to have an electro-mechanical simulation of a human hand. This is undoubtedly a problem in that except when assembling or handling regular objects on an assembly line the world we live in does not consist of perfectly flat surfaces or absolutely regular objects. Thus, while it appears relatively simple, the action of the human hand in gripping support an object is an extremely complex one which is beyond the ability of most robot hands or gripping devices.

This problem is particularly acute in mechanical handling or assembly operations.

OBJECTS

The present invention is directed towards providing an improved construction of robotic hand.

SUMMARY OF THE INVENTION

According to one aspect of the invention there is provided a robotic hand comprising:

a base support;
a jointed finger, mounted on the base support, formed from a plurality of link elements;
a pivot joint between each link element;
drive means for pivoting a link element about another link element; and
torque control means to prevent undue pressure being exerted by a link element on an object under the influence of the drive means.

Thus, on activating the means for pivoting the joint the joint will continue to pivot until the link element it is pivoting meets an object with sufficient resistance to activate the torque control means to stop is pivoting. The element thus exerts a constant pressure on the object.

The invention will be more clearly understood from the following description of some preferred embodiments thereof given by way of example only with reference to the accompanying drawings in which:

BRIEF DESCRIPTION OF THE DRAWINGS

FIG. 1 is a plan view of a robotic hand according to the invention,

FIG. 3 is a plan view of another construction of robotic hand according to the invention, FIG. 5 is a plan view of a link element used in another construction of robotic hand according to the invention, FIG. 6 is a cross-sectional view in the direction of the arrows V—V of FIG. 4.

DETAILED DESCRIPTION OF THE INVENTION

Figure 2:
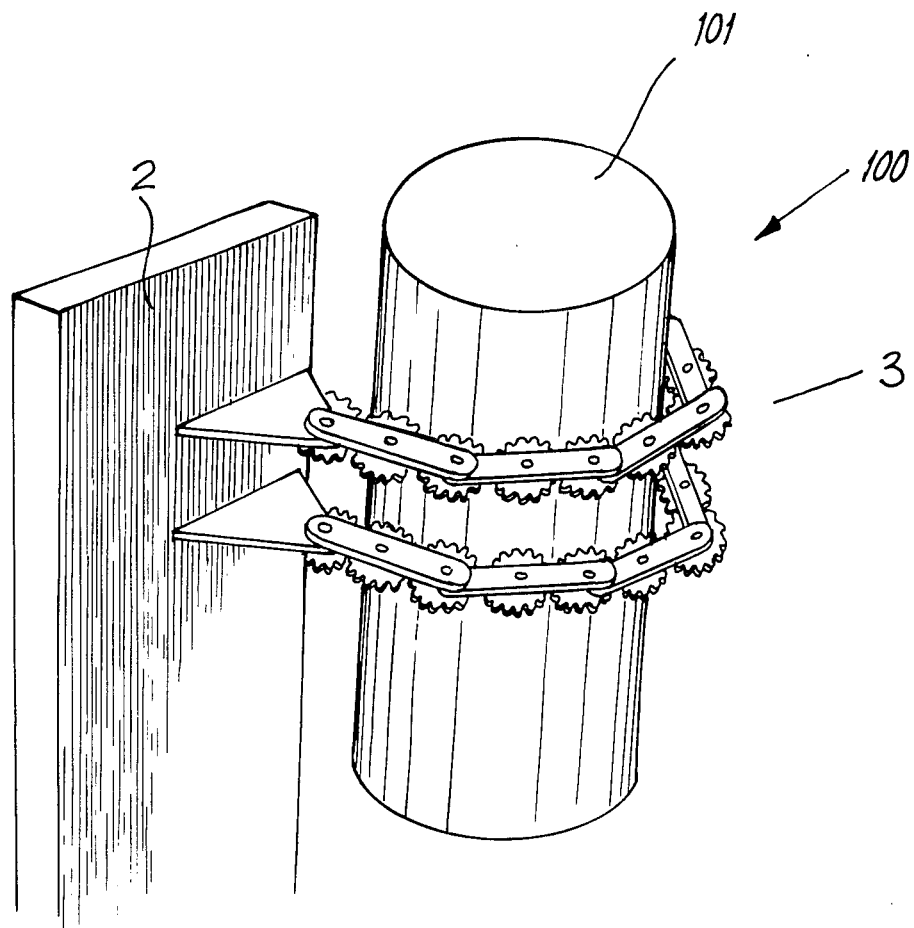
FIG. 2 is a perspective view of a robotic hand according to the invention.

Referring to FIG. 1 there is illustrated a robotic hand, indicated generally by the reference numeral 1 having a base support 2 and a jointed finger indicated by the reference numeral 3. The base support 2 performs the function of the palm of a hand. The base support 2 is mounted on a suitable structure or machine, not shown.

The jointed finger 3 comprises a plurality of link elements 4(a) to 4(d). The link element 4(a) is connected to the base support 2 by a pivot shaft 5(a) and to the link element 4(b) by a pivot shaft 5(b). Then the link element 4(b) is connected to the link element 4(c) by a pivot shaft 5(c) while the link element 4(d) is connected to the link element 4(c) through a pivot shaft 5(d). Mounted on the pivot shafts 5(a) to 5(d) are gears 6(a) to 6(d) respectively. Idler gears 7(a) to 7(c) mounted on pivot shafts 8(a) to 8(c) interconnect the gears 6(a) to 6(b); 6(b) to 6(c); and 6(c) to 6(d). Friction pads 9(a) to 9(c) respectively connect the gear 6(a) to the link element 4(a); the gear 6(b) to the link element 4(b); the gear 6(c) to the link element 4(c); and the gear 6(d) to the link element 4(d). The gear 6(a) is driven by means, not shown, through a further drive gear 10 all of which forms a gear train.

Referring to FIG. 2 there is illustrated a robotic hand indicated generally by the reference numeral 100 which is identical to the robotic hand 1 so that parts similar to those illustrated with reference to FIG. 1 are identified by the same reference numerals. The only difference between this robotic hand 100 and the robotic hand 1 is that it has three jointed fingers 3, also illustrated is an object 101 gripped between the base support 2 and the jointed fingers 3.

In operation referring to FIGS. 1 and 2 the drive gear 10 is driven, for example, in an anti-clockwise direction as indicated by the arrow which in turn causes the drive to be transmitted in the direction of the arrows shown on all the other gears. When the drive gear 10 is driven anti-clockwise the gear 10 drives the gear 6(a) clockwise which in turn through the friction pad 9(a) pivots the link element 4(a) and the jointed finger 3 pivots about the pivot shaft 5(a). There is no rotary motion imparted to any of the other gears relative to the links on which they are mounted. When the link element 4(a) meets an obstruction such as the object 101 to be gripped the gear 6(a) continues to rotate but now the motion transferred through the friction pad 9(a) is lost as the link element 4(a) is no longer pivoting. Thus, the idler gear 7(a) is driven as is the next gear 6(b) which through its respective friction pad 9(b) causes the link element 4(b) to pivot about the pivot shaft 6(b). Again there will be no relative motion between the gears 7(b) onwards.

For example, when the jointed finger 3 is pivoted about the pivot shaft 5(a) and it is the link element 4(c) that first meets an obstruction, the drive will be transmitted through the gears 6(a), 7(a), 6(b), 7(b), 6(c), 7(c)

and 5(d). This will cause the link element 4(d) to pivot about the shaft 5(d) tending to wrap it about an obstruction and carrying with it any subsequent link elements until they in turn meet an obstruction.

When the drive gear 10 is rotated clockwise the entire assembly will open into its initial position.

Referring to FIG. 3 there is illustrated an alternative construction of robotic hand indicated generally by the reference numeral 15 in which parts similar to those described with reference to FIG. 1 are identified by the same reference numerals. Mounted on the base support 2 is a stop 16 while mounted on the link element 4(a) is a stop 17. In this embodiment therefore when the drive gear 10 (not shown in this drawing) is rotated in the clockwise direction the stop 16 and 17 will prevent further pivoting of the link elements 4(a) and 4(b). Similarly, stops could be placed on each of the link elements or alternatively externally mounted stops may be used.

In one embodiment of the invention the gear which drives the final link element may be pinned to this link in which case at the end of travel all the gears will be immobilised and the stall force available from the drive gear 10 will be equally distributed as holding forces along the points of contact with an object.

Alternatively, the gear which drives the final link element may drive it through a friction pad similar to those used at the other joints in which case all the gears would continue to rotate and the holding forces would be a function of the friction provided at each joint.

It will be appreciated that the friction may be varied to distribute the pressure unevenly on an object.

Figure 4:
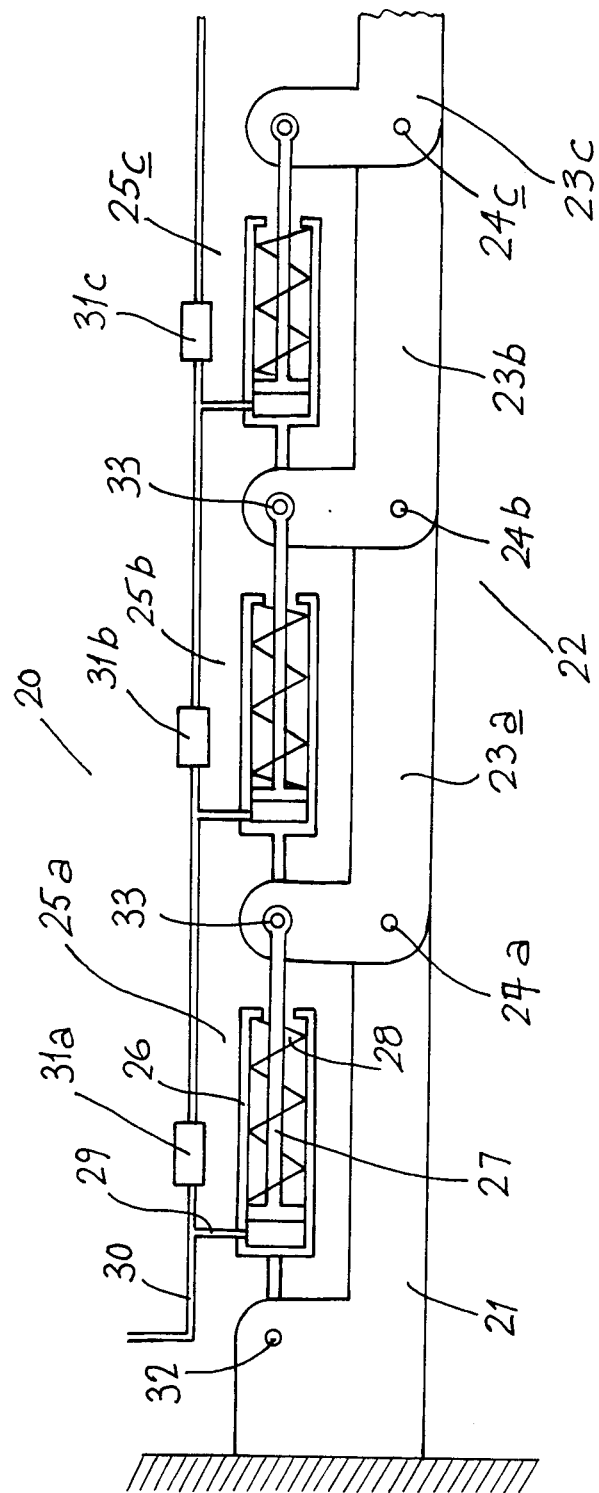
FIG. 4 is a plan view of a still further construction of robotic hand according to the invention.

Referring to FIG. 4 there is illustrated an alternative construction of robotic hand indicated generally by the reference numeral 20 having a base support 21 and a jointed finger, indicated generally by the refernece numeral 22.

The jointed finger 22 comprises a plurality of link elements 23(a) to 23(c). The link element 23(a) is mounted on the base support 21, the link element 23(b) on the link element 23(a) and the link element 23(c) on the link element 23(b) by pivot pins 24(i a), (b) and (c) respectively. Ram assemblies indicated generally by the reference numerals 25(a) to 25(c) are provided. The ram assembly 25(a) interconnects the base support 21 and the link element 23(a); the ram assembly 25(b) interconnects the link element 23(a) and the link element 23(b); and the ram 25(c) interconnects the link element 23(b) and 23(c). Each ram assembly 25 is single acting and comprises a cylinder 26 and a piston 27 biased by a spring 28. Each cylinder 26 is provided with a feed inlet pipe 29 from a main fluid pressure pipeline 30. Pressure relief valves 31(a) to 31(c) are provided for the ram assemblies 25(a) to 25(c) respectively. Pin joints 32 are used to mount the cylinders 26 and pin joints 33 are used to mount the pistons 27 on the respective base support or link element as the case may be.

In operation, hydraulic fluid is introduced into the fluid pressure pipeline 30 delivered through the feed inlet pipe 29 to the cylinder 26 of the ram assembly 25(a) which will cause the link element 23(a) and the other link elements attached thereto to pivot. When the pressure exceeds a predetermined value, the pressure relief valve 31(a) opens and allows pressurised fluid into the ram assembly 25(b) and so on. It will also be appreciated that the pressure relief valves allow fluid to flow on the return when pressure is not applied but will only flow in the opposite direction when the pressure is greater than a preset minimum.

It is envisaged that double acting cylinders may be used. It is further envisaged that in addition to pressure relief valves that feed inlet valves may be provided which are actuated by some pressure sensing means on each link element. Many other types of fluid pressure actuated may be used.

Referring to FIGS. 5 and 6 there is illustrated one complete link element 36 and a portion of a link element 36(a) which forms part of a jointed finger of a robotic hand according to the invention. Each link element 36 is of cranked construction and has a female end portion 37 and a male end portion 38. Cut in the female end portion 37 is an arcuate groove forming a chamber 39.

The female end portion 37 includes an upright pillar 40 having a through bore 41. The male end portion 38 includes a socket 42 for reception of the bore 41 of another link element and it also has a through bore 43. Depending from the male end portion 38 and adapted in use to fit within the chamber 39 is a flap-like member forming a piston 44. A pair of fluid passageways 45 and 46 interconnect the ends of the chamber 39 with the bottom face of the male end portion 38 at either side of the piston 44. Thus, the fluid passageways 45 and 46 communicate with the chamber 39 on either side of the piston 44. A pressure relief valve 47 is mounted in the fluid passageway 45. To assemble the link element 36 and the link element 36(a) the pillar 40 engages within the socket 42 and is secured thereto by a bolt 48 and a nut 49. Suitable O-rings 50 are provided between the faces of the female end portion 37 and the male end portion 38.

In operation fluid pressure delivered through the fluid passageway 45 impinges against the face of the piston 44 causing the male end portion 38 to rotate within the female end portion 37, the hydraulic fluid being returned through the fluid passageway 46. It will be appreciated that the pressure relief valve 47 transfers pressure only when a link element meets an obstruction.

Figure 7:
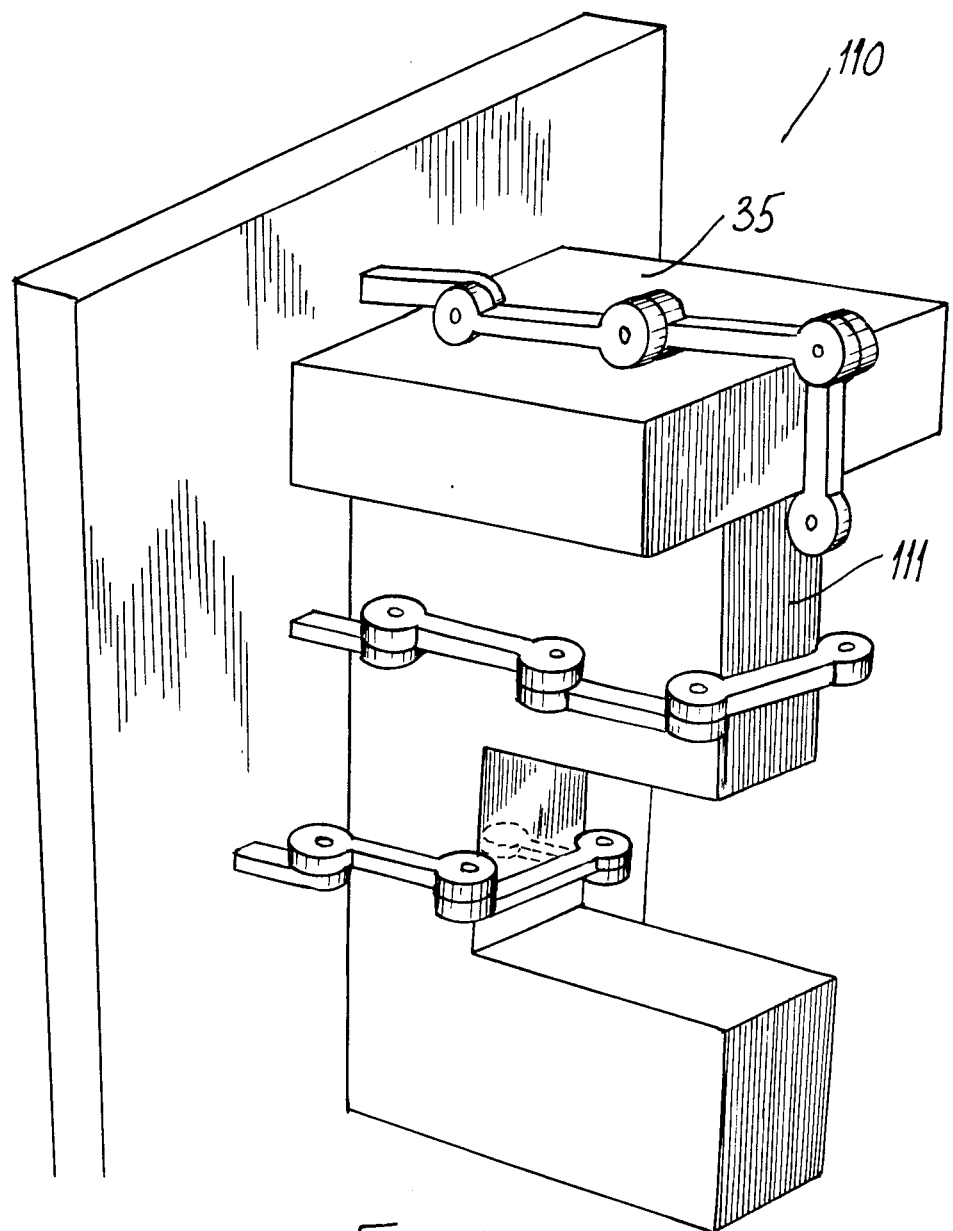
FIG. 7 is a perspective view of another construction of robotic hand according to the invention.

Referring to FIG. 7 there is illustrated a robotic hand indicated generally by the reference numeral 110 incorporating a plurality of link elements similar to those described with reference to FIGS. 5 and 6 and identified by the same reference numerals. Gripped between the robotic hand 110 is an irregular shaped object 111. It will be noted that in this robotic hand one of the fingers formed from the link elements 36 pivots in a different plane to that of the other fingers.

It will further be appreciated and is not illustrated for simplicity that the pivot joint and drive means could be so arranged that any link element could pivot in at least two separate planes. For example, the use of universal joints instead of pivot joints and a suitably modified drive would allow the embodiment of FIG. 4 to be modified to achieve this result.

It is envisaged that the link elements may be covered by a suitable padding. Alternatively they and the base support may be housed within a fluid filled glove.

It will be appreciated that the control of the friction between the link elements is all important. For example, instead of friction pads a clutch-like drive may be used whereby the link element will continue to pivot until the pressure exerted by the link element on an object in contact therewith is greater than a pre-set pressure whereby the drive is transmitted to the next link element.

It is also envisaged that torque control means could be provided by a tension spring mounted between adjacent element or alternatively by a torsion spring incorporated in each pivot joint. Similarly, it is envisaged that a drive means in the form of a helical bi-metallic strip connecting adjacent link elements could be used. Needless to say, it would be necessary to supply associated switch elements and a power source.

The invention provides an electro-mechanical simulation of a human hand. It will be appreciated that one of the advantages of the present invention is that in operation the joints will flex to encompass an object rather than simply impinge against it. It is envisaged that many other methods of achieving the objects of the invention may be provided. Essentially any means of providing a stepped drive along a jointed finver may be used.

I claim:

1. A robotic hand for gripping regularly shaped and irregularly shaped objects, comprising:
   (a) a base support;
   (b) a jointed finger, mounted on the base support and formed by a plurality of link elements;
   (c) a pivot joint between each link element;
   (d) a drive means for each link element for pivoting a link element about another link element in which each drive means is interconnected to form a sequential drive from an innermost link element adjacent the base to an outermost link element; and
   (e) a slip coupling between each link element and an associated drive means to prevent further pivoting of the link element and to transfer drive from an inner link element to a next outermost link element, said coupling operating when the pressure exerted by said inner link element on an object being gripped exceeds a pre-set pressure to cause the coupling to slip.

2. A robotic hand as recited in claim 1 in which each slip coupling comprises a friction coupling between a drive means and an associated link element.

3. A robotic hand as recited in claim 1 in which the slip coupling comprises a tension spring mounted between adjacent link elements.

4. A robotic hand as recited in claim 1 in which the slip coupling comprises a torsion spring incorporated in each pivot joint.

5. A robotic hand as recited in claim 1 in which the sequential drive includes a gear train with a drive gear connected through a friction clutch to each link element to form each drive means and at least one idler gear between adjacent drive gears.

6. A robotic hand as recited in claim 5 in which the friction clutch is a friction pad.

7. A robotic hand as recited in claim 5 in which there is no slip coupling between the drive means and the outermost link element relative to the base support, the stall force of the drive means determining the ultimate pressure that the jointed finger can exert.

8. A robotic hand as recited in claim 6 in which there is no slip coupling between the drive means and the outermost link element relative to the base support, the stall force of the drive means determining the ultimate pressure that the jointed finger can exert.

9. A robotic hand as recited in claim 1 in which each drive means comprises a fluid pressure actuator mounted between two link elements, each fluid pressure actuator feeding a next outermost fluid actuator through a pressure release valve.

10. A robotic hand as recited in claim 9 in which each fluid pressure actuator comprises:
    a fluid pressure power source;
    a plurality of ram assemblies each connected between adjacent link elements;
    a fluid pressure link connecting each ram assembly to the power source; and
    a pressure release valve in the fluid pressure line between each ram assembly to form the slip coupling.

11. A robotic hand as recited in claim 9 in which each link element forms portion of the fluid pressure actuator and comprises:
    a male end portion;
    a female end portion for reception of the male end portion of another link element;
    a pivot joint for securing a male end portion within a female end portion;
    a chamber formed within the female end portion by an arcuate, in plan, recess;
    a fluid tight piston connected to the male end portion and mounted within the chamber; and in which the remainder of the fluid pressure actuator being provided by a fluid pressure power source and line connected to each chamber, and
    a pressure relief valve.

12. A robotic hand as recited in claim 1 in which the drive means is a helical bi-metallic strip connecting adjacent link elements, associated switch elements and a power source.

13. A robotic hand as recited in claim 5 in which stop means is associated with each link element to control the relative pivotal movement between adjacent link elements.

14. A robotic hand as recited in claim 7 in which stop means is associated with each link element to control the relative pivotal movement between adjacent link elements.

15. A robotic hand as recited in claim 1 in which a sensor is provided on a link element to sense the pressure exerted by the link element on an object, the sensor forming part of the slip coupling.

16. A robotic hand as recited in claim 15 in which additional sensors are provided to measure other physical phenomena of an object in contact with the link element.

17. A robotic hand as recited in claim 1 in which the pivot joint allows pivotal movement of the link element in at least two separate planes.

18. A robotic hand as recited in claim 1 inclusive including a plurality of jointed fingers.

19. A robotic hand as recited in claim 18 in which at least one of the fingers pivots in a different plane to that of the other fingers.

20. A robotic hand as recited in claim 18 in which the robotic hand is mounted within a sealed glove containing a fluid.

21. A robotic hand as recited in claim 19 in which the robotic hand is mounted within a sealed glove containing a fluid.

* * * * *